(12) United States Patent
Beall et al.

(10) Patent No.: US 9,889,592 B2
(45) Date of Patent: Feb. 13, 2018

(54) EXTRUSION DIE WITH CURVED FACE

(75) Inventors: Douglas Munroe Beall, Painted Post, NY (US); Thomas William Brew, Corning, NY (US); Christopher John Malarkey, Corning, NY (US); Seth Thomas Nickerson, Corning, NY (US); David John Thompson, Savona, NY (US)

(73) Assignee: Corning Incorporated, Corning, NY (US)

( * ) Notice: Subject to any disclaimer, the term of this patent is extended or adjusted under 35 U.S.C. 154(b) by 626 days.

(21) Appl. No.: 13/482,408

(22) Filed: May 29, 2012

(65) Prior Publication Data
US 2013/0320586 A1    Dec. 5, 2013

(51) Int. Cl.
| B29C 47/08 | (2006.01) |
| B28B 3/26 | (2006.01) |
| B29C 47/00 | (2006.01) |
| B29C 47/36 | (2006.01) |

(52) U.S. Cl.
CPC .............. B29C 47/08 (2013.01); B28B 3/269 (2013.01); B29C 47/0028 (2013.01); B29C 47/362 (2013.01)

(58) Field of Classification Search
CPC ......... B29C 47/28; B29C 47/30; B29C 47/54; B29C 47/60; B29C 47/66; B29C 47/686
USPC ............ 264/211.21, 171.21, 171.13, 171.11, 264/171.12, 540, 176.1, 177.1, 177.12, 264/177.13, 177.16, 177.15; 425/382 R, 425/376.1, 113, 114, 131.1, DIG. 16, 425/DIG. 243
See application file for complete search history.

(56) References Cited

U.S. PATENT DOCUMENTS

| 3,609,808 | A | | 10/1971 | Hans-Rudolf Jacobi et al. ................................. 18/12 |
| 3,688,544 | A | * | 9/1972 | Sagmuller et al. ............. 72/261 |
| 3,790,654 | A | | 2/1974 | Bagley .......................... 264/177 |
| 3,863,001 | A | * | 1/1975 | Thumudo, Jr. ............... 264/148 |
| 4,343,604 | A | * | 8/1982 | Minjolle ................... 425/192 R |
| 5,286,323 | A | | 2/1994 | Bagley ............................ 156/89 |
| 6,994,816 | B2 | | 2/2006 | Ishii et al. |
| 7,276,194 | B2 | * | 10/2007 | Shalkey ................... 264/177.12 |

(Continued)

FOREIGN PATENT DOCUMENTS

| CN | 1551818 | 12/2004 |
| EP | 0 027 252 | 4/1981 |

(Continued)

OTHER PUBLICATIONS

Exhibit A. Figure 4 of US 20100316856 A1.*

(Continued)

*Primary Examiner* — Matthew Daniels
(74) *Attorney, Agent, or Firm* — Jakub M. Michna

(57) ABSTRACT

The present disclosure provides a flow device including a body disposed in an extrusion apparatus. The body is defined along a plane and has a first side and a second side. The second side is disposed opposite the first side. The flow device also includes a first face formed at the first side and a second face formed at the second side. The body has a thickness defined between the first face and second face. A plurality of feedholes is defined in the body between the first side and the second side. In addition, at least a portion of the first face or second face forms a curvature that extends outwardly from the plane.

24 Claims, 11 Drawing Sheets

(56) References Cited

U.S. PATENT DOCUMENTS

2008/0095873 A1* 4/2008 Gibbons ............ B29C 47/0014
  425/4 R
2010/0316856 A1* 12/2010 Currie et al. ................. 428/213
2011/0291319 A1   12/2011 Avery et al.

FOREIGN PATENT DOCUMENTS

| EP | 0 463 654    | 1/1992 |
|----|--------------|--------|
| JP | H0914162 A   | 6/1997 |
| JP | H09141629 A  | 6/1997 |
| JP | 2002079510 A | 3/2002 |
| JP | 2008532818 A | 8/2008 |
| NL | 7 209 165    | 5/1973 |

OTHER PUBLICATIONS

Exhibit B. Annotated version of Fig. 4 of US 2010/0316856 A1.*
Exhibit C. Annotated version of Fig. 3 of Gibbons (US 2008/0095873 A1).*
Patent Cooperation Treaty International Notification of Transmittal of the International Search Report and The Written Opinion of the International Searching Authority, international application No. PCT/US2013/042389; dated Oct. 9, 2013, 10 pages.
Chinese application No. 201380028355.5, dated Jan. 4, 2016, Notice on the First Office Action (PCT Application in the National Phase), pp. 1-14.
Office Action dated Oct. 25, 2016 for JP Patent Application No. 2015-515072 filed May 23, 2013.

* cited by examiner

EXTRUSION DIE WITH CURVED FACE

FIELD OF THE DISCLOSURE

The present disclosure relates to an extrusion die, and in particular, to an extrusion die with a curved face.

BACKGROUND

An extrusion process can create an object having a complex cross-section. In a conventional process, batch material is inserted into a chamber of an extruder barrel. Once inside the chamber, the material is pressurized by a pressure mechanism such as a pump, a piston, screws, or other conventional means. The pressure inside the chamber must be sufficiently high to overcome the material's resistance to flow, which is produced by a die disposed in the chamber. Once the resistance to flow is overcome, the pressure forces the material through the chamber from the inlet of the extruder barrel towards the die. The material can pass through openings or channels defined in plates disposed throughout the chamber between the inlet and die. As the material reaches the die, it is extruded through one or more feedholes and discharge slots defined in the die to form an extrudate having a desired geometry (e.g., a honeycomb body).

The conventional die is designed to produce a desired shape of the extrudate (e.g., the contour and cell pattern of the honeycomb body), but to do so, the die must also withstand the extreme pressure created within the extrusion chamber. Thin discharge slots required to form, e.g., thin wall honeycomb bodies, require high pressures within the extrusion chamber. If designed incorrectly, the die can deform or rupture due to plate bending from the pressure. Thus, the thickness of the die is often increased to withstand the high pressure built within the chamber. This is the same with other elements having restrictive openings that may be disposed in the chamber. As with any plate bending problem, as the diameter of the plate is increased the thickness of the plate must also be increased to stay within the yield limits of the material. As a consequence, the impedance and resistance to flow through openings in the die undesirably increase as the die thickness increases.

Thus, a need exists for an improved die that reduces the impedance and resistance to flow through the die. It is also desirable to increase throughput of the extrusion process while reducing the stress exerted on the die.

SUMMARY

In an exemplary embodiment of the present disclosure, a plate is disposed in an extrusion apparatus. The plate includes a body defined along a plane and having a first side and a second side. The second side is disposed opposite the first side. The plate also includes a first face formed at the first side and a second face formed at the second side. The body has a thickness defined between the first face and second face. A plurality of openings is defined in the body between the first side and the second side. In addition, at least a portion of the first face or second face forms a curvature that extends outwardly from the plane.

In one aspect of this embodiment, each of the plurality of openings can be defined parallel to one another between the first side and the second side. Also, each of the plurality of openings can extend substantially perpendicular to the plane. In another aspect, the curvature can be ellipsoidal, conical, tori-spheroidal, or hemispherical.

In a further aspect, the plate can include a first region, a second region, and a third region. The first region can be defined near the center of the body and have a thickness which is substantially constant in a direction perpendicular to the plane. The second region can be defined near an edge of the body and is adapted to couple to the extrusion apparatus. The third region can be defined between the first region and second region. The first region can include a first radial thickness and a second radial thickness, where the first radial thickness is defined near the center of the first region and the second radial thickness is defined near the third region. The first radial thickness can be greater than the second radial thickness.

In another embodiment, an extrusion apparatus is provided for forming an extrudate. The apparatus can include a barrel having an inlet at one end thereof and an outlet at an opposite end. The barrel defines a chamber between the inlet side and outlet side. A pressure mechanism is disposed near the inlet of the barrier for pressurizing the chamber and is configured to move material from the inlet to the outlet. A flow path is defined in the chamber between the inlet and outlet and defines a flow direction. The apparatus also includes a die coupled to the outlet of the barrel. The die can include a body defined along a plane which is substantially perpendicular to the flow direction, an inlet side and an outlet side. The thickness of the body is defined between the inlet side and the outlet side. The die can also include a plurality of feedholes defined between the inlet side and the outlet side, where the plurality of feedholes is adapted to receive material at the inlet side and extrude the material at the outlet side. In addition, at least a portion of the inlet side or the outlet side forms a curvature that extends outwardly from the plane.

In one aspect of this embodiment, the plurality of feedholes is substantially parallel to one another. The plurality of feedholes can also be defined in the body substantially along the flow direction. In another aspect, the curvature can be ellipsoidal, conical, tori-spheroidal, or hemispherical. In a further aspect, the die can include a first region, a second region, and a third region. The first region can be defined near the center of the body and have a substantially constant thickness in the flow direction. The second region can be defined near an edge of the body and be coupled to the extrusion apparatus. The third region can be defined between the first region and second region. In addition, the first region can include a maximum radial thickness defined substantially in the flow direction near the center of the first region and a minimum radial thickness defined near the interface of the first and third regions. The plurality of feedholes can be defined in the first region.

In a related aspect, the extrusion apparatus can include a homogenizer disposed in the chamber between the inlet and the die. The homogenizer can include an inner portion and an outer portion. The outer portion can be coupled to the barrel and the inner portion can include a first side oriented towards the inlet and a second side disposed opposite the first side. A plurality of openings can be defined in the inner portion between the first side and second side and be substantially parallel to the flow direction. At least one of the first side and second side can have a curved cross-section. Alternatively, both the first side and second side can have curved cross-sections.

The extrusion apparatus can also include a plate disposed in the chamber between the inlet and the die. The plate can have an outer portion coupled to the barrel and an inner portion comprising a screen-like material. The inner portion can have at least one curved face. Alternatively, the inner portion can have a first curved face and a second curved face, where the first curved face is oriented towards the inlet and the second curved face is oriented towards the die.

In a different embodiment, a method is provided for forming an extrudate in an extrusion apparatus. The extrusion apparatus can include a barrel having an inlet at one end thereof and an outlet at an opposite end, a chamber defined in the barrel between the inlet and outlet, a pressure mechanism disposed near the inlet of the barrier, and a die coupled to the outlet of the barrel, the die having an inlet side and an outlet side. The method can include inserting material into the chamber through the inlet, pressurizing the chamber with the pressure mechanism, moving the material from the inlet to the outlet of the barrel along a flow direction, receiving the material at the inlet side of the die, flowing the material through a plurality of feedholes defined in a curved cross-section formed at the inlet side or outlet side of the die, and extruding the material from the outlet side of the die to form an extrudate.

In one aspect of this embodiment, the method can include passing the material through the plurality of feedholes along a direction substantially parallel to the flow direction. In another aspect, the method can include passing material through an opening formed in a curved cross-section of a homogenizer or stip plate disposed between the inlet and outlet of the barrel.

BRIEF DESCRIPTION OF THE DRAWINGS

The above-mentioned aspects of the present disclosure and the manner of obtaining them will become more apparent and the claimed invention itself will be better understood by reference to the following description of exemplary embodiments, taken in conjunction with the accompanying drawings, wherein:

Corresponding reference numerals are used to indicate corresponding parts throughout the several views.

DETAILED DESCRIPTION

The embodiments described below are not intended to be exhaustive or to limit the invention to the precise forms disclosed in the following detailed description. Rather, the embodiments are chosen and described so that others skilled in the art may appreciate and understand the principles and practices of the invention as claimed herein.

The present disclosure provides an improved extrusion apparatus and method of using in a process of making an extrudate such as a cellular ceramic substrate. A ceramic material in the form of a batch material is provided and passed through a twin screw extrusion apparatus to mix, screen, de-air, convey and force the batch material through a die assembly.

For purposes of this disclosure, the terms "extrusion phase" or "extrude" as used herein mean the conveying or transporting of the batch material through the barrel of the extruder and forcing the batch material through the die assembly. The terms "flow direction" and "extrusion direction" are intended to be interchangeable and mean the direction by which the batch material is conveyed through the barrel and forced through the die assembly. In addition, the terms "extruder" and "extruder apparatus" are intended to be interchangeable.

The term "batch material" as used herein can be a wet mixture of dry ceramic raw materials, such as clay, talc, alumina and mullite, a binder/plasticizer, such as polyvinyl alcohol, and/or water. As an example, there can be between about 50-75% by weight dry ingredients and between about 25-50% by weight wet ingredients in the batch material. The batch material when reacted can form a ceramic material such as carbides or refractory oxides.

Figure 1:
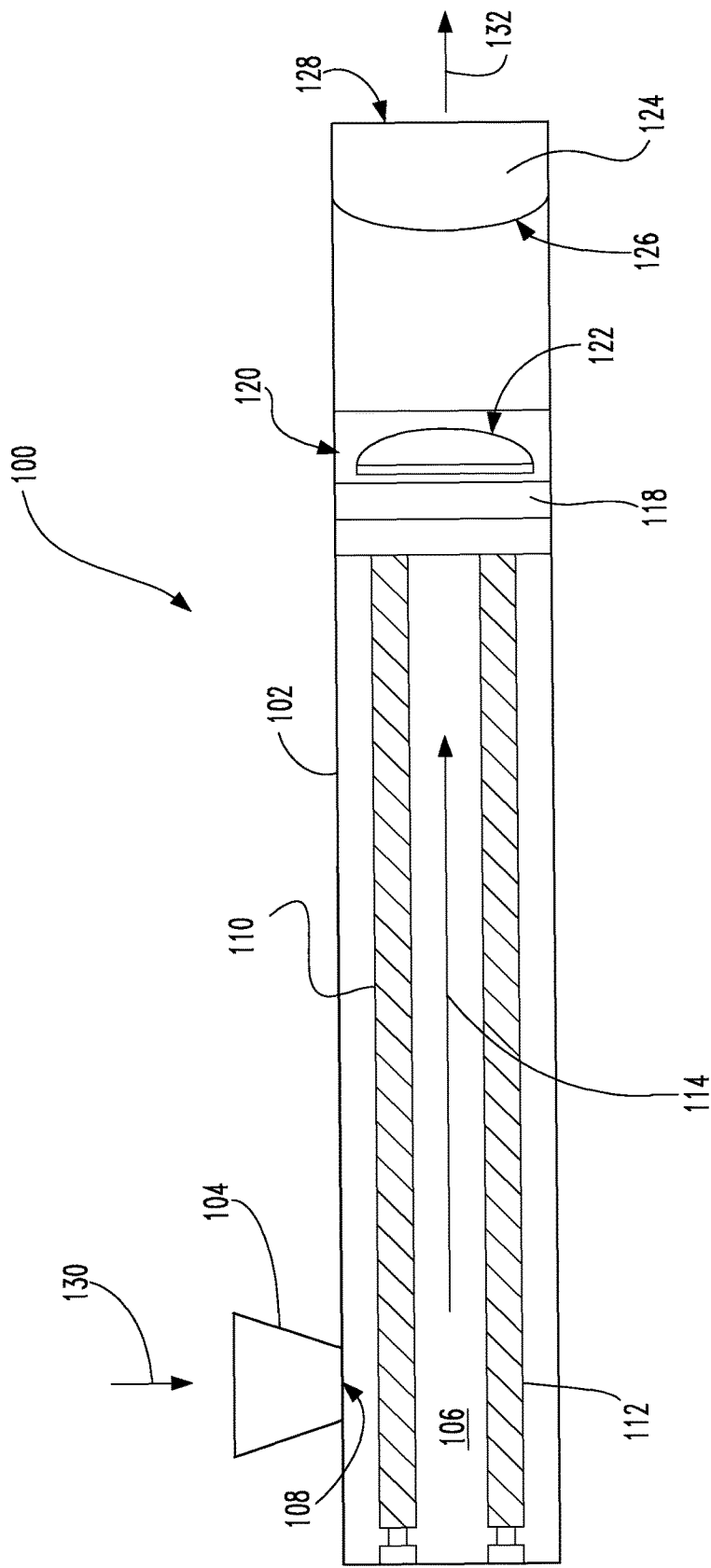
FIG. 1 is a schematic view of an extruder.

Referring to FIG. 1, an exemplary embodiment of a twin screw extruder 100 is shown. The extruder 100 includes an outer housing or barrel 102 which defines an internal chamber 106. Batch material 130 can be inserted into the extruder 100 through a hopper 104, which is disposed near an inlet 108 of the extruder 100. As the batch material 130 enters the extruder 100, the batch material 130 is picked up by a pair of screws 110, 112 disposed in the chamber 106. The screws 110, 112 are positioned within the barrel 102 along a longitudinal direction. The longitudinal direction can also be referred to as the extrusion direction which is identified by arrow 114 in FIG. 1.

The screws 110, 112 can form a pressure mechanism in the barrel 102 to pressurize the chamber 106 and force the batch material 130 along the extrusion direction 114. The screws 110, 112 can be co-rotating or counter-rotating, intermeshing or non-meshing. In one embodiment, the screws 110, 112 are co-rotating, intermeshing, and self-cleaning screws. The screws 110, 112 are shown in this embodiment as one type of pressure mechanism that can be used to pressurize the chamber 106. However, in other embodiments, a piston can be used in a ram extrusion process to force the batch material along the extrusion direction 114. Other known pressure mechanisms can be used in an extrusion process.

As the screws 110, 112 rotate and increase the pressure inside the chamber 106, the batch material 130 can be forced along a flow path defined between the inlet 108 and an outlet 128 of the barrel 102. The pressure inside the chamber 106 can also force the material through one or more other flow devices within the barrel 102 that alter or restrict the flow of batch material 130 moving off the ends of the mixing screws 110, 112. For example, one such flow device is a static plate 118 that may include one or more restrictive openings. The size and shape of the one or more restrictive openings can depend on the application and desired flow or pressure profile of the batch material 130. An example of a flow device such as the static plate 118 is further described in U.S. Publication Ser. No. 2011/0291319, filed on Nov. 24, 2010, which is hereby incorporated in its entirety by reference.

In FIG. 1, the static plate 118 can include mesh or screen-like material to filter the batch material 130. The one or more flow devices, including the static plate 118, can have a plurality of openings or channels through which the batch material 130 is forced by the screws 110, 112. In one embodiment, the one or more flow devices can also include another plate 120 which is used to facilitate localized mixing and homogenization of the batch material 130. Since portions of the batch material 130 can have different viscosities, the plate 120 can mix the material together to improve the extrusion flow rate. As shown in FIG. 1, the plate 120 can include a curved face 122 that promotes flow. This will be described in further detail below.

Once forced through the plate 120, pressure inside the chamber 106 forces the batch material 130 to another flow device in the form of an extrusion die 124. The die 124 is disposed near the outlet 128 of the barrel 102 such that a desired shaped product is extruded out of the barrel 102 through the die 124 along an extrusion direction identified by arrow 132. Although not shown in FIG. 1, the die 124 can include a plurality of feedholes and slots defined between an inlet side and outlet side of the die 124. In FIG. 1, the inlet side of the die 124 can have a face 126 oriented towards the pair of screws 110, 112. The outlet side of the die 124 can have an outlet face, which corresponds to the outlet 128 of the barrel 102. As shown, the curved inlet face 126 of the die 124 can provide desirable effects on the extrusion process, some of which are described below. Although the outlet face of the die is shown as being substantially flat, the outlet face can be formed without being flat (e.g., include a curvature).

Figure 2:
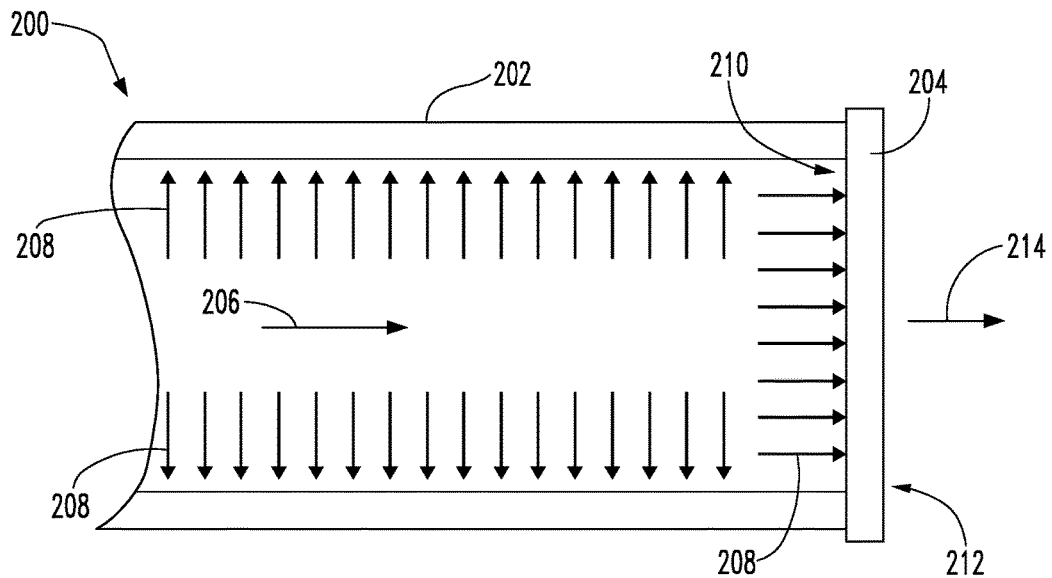
FIG. 2 is a schematic view of a conventional extruder and flat-faced die.

Referring to FIG. 2, a conventional extrusion apparatus 200 is shown. The apparatus 200 includes an outer housing or barrel 202 through which batch material is extruded. The batch material enters the barrel 202 through an inlet (not shown) and is extruded through a conventional die 204 at an outlet 212. The material flows through the barrel 202 along an extrusion direction identified by arrow 206 and is extruded through the die 204 along a direction identified by arrow 214. The barrel 202 defines an internal chamber that is pressurized by a pressure mechanism. The pressure formed in the chamber exerts a force against the barrel 202 and die 204 as shown by arrows 208.

In FIG. 2, the conventional die 204 includes a flat inlet face 210 and a flat outlet face 212. The outlet face 212 also corresponds to the outlet of the barrel 202. The thickness of the die 204 is defined between both faces. As described above, the pressure inside the chamber can exert substantial forces against the die 204 such that the thickness of the die 204 must be increased to avoid deformation or rupture. As the thickness of the die 204 is increased, however, the impedance and resistance to flow in the extrusion direction 206 can undesirably increase as well.

Figure 3:
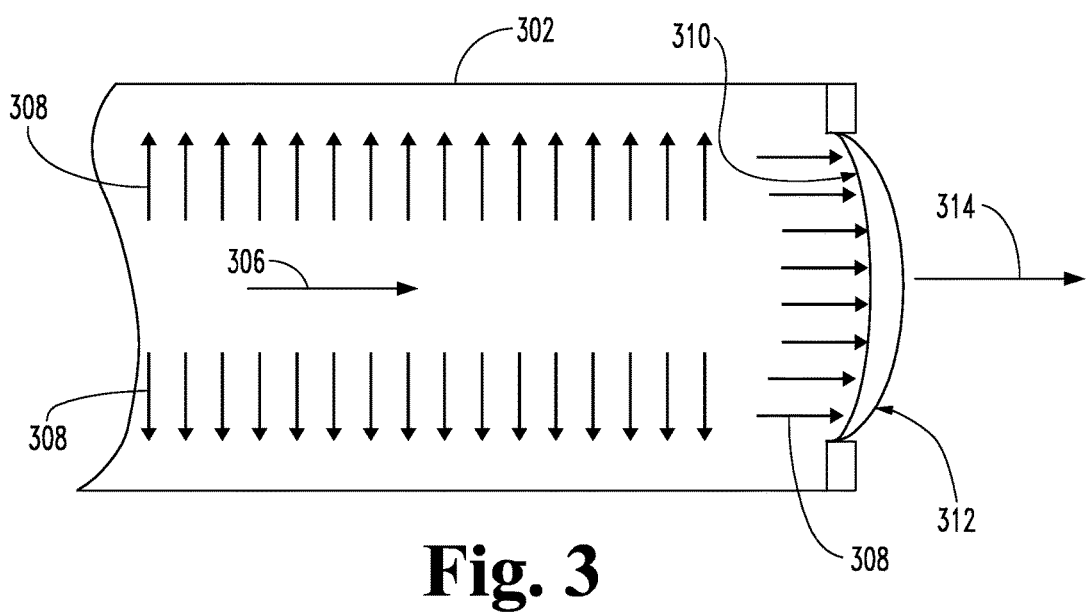
FIG. 3 is a schematic view of an extruder with a curved die according to the present disclosure.

An exemplary embodiment of an improved extrusion apparatus 300 is illustrated in FIG. 3. The apparatus 300 includes an outer housing or barrel 302 through which batch material enters and is extruded from. The barrel 302 includes an inlet (not shown) at one end and an outlet 312 at an opposite end. A die is disposed at the outlet of the barrel 302. The barrel 302 also defines an internal chamber which is pressurized by a pressure mechanism such as extrusion screws or a piston. The pressure exerts a force against the barrel 302 and die as indicated by arrows 308. The batch material flows along an extrusion direction identified by arrow 306 and is extruded through the die outlet 312 along a direction identified by arrow 314. Unlike the flat faces of the conventional die 204 depicted in FIG. 2, the die in FIG. 3 includes a curved inlet face 310 and a curved outlet face 312. Although both the inlet face 310 and outlet face 312 are shown as being curved, in alternative embodiments only one of the two faces is curved.

Figure 4:
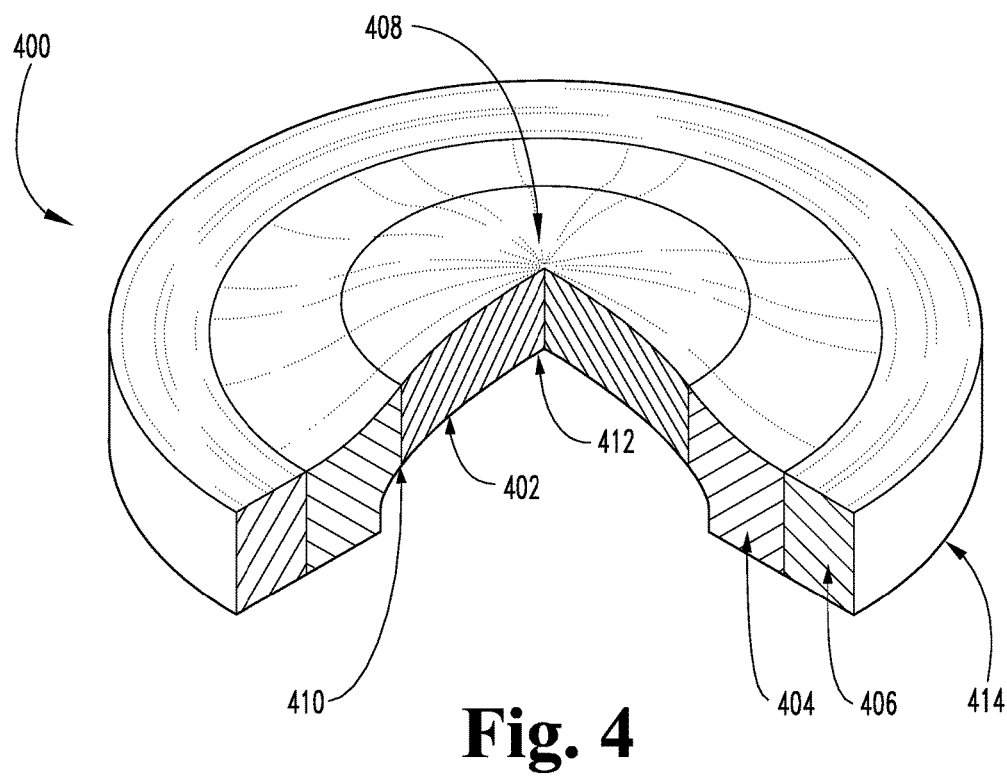
FIG. 4 is a partial isometric view of an ellipsoidal curved die having a plurality of regions.
Figure 5:
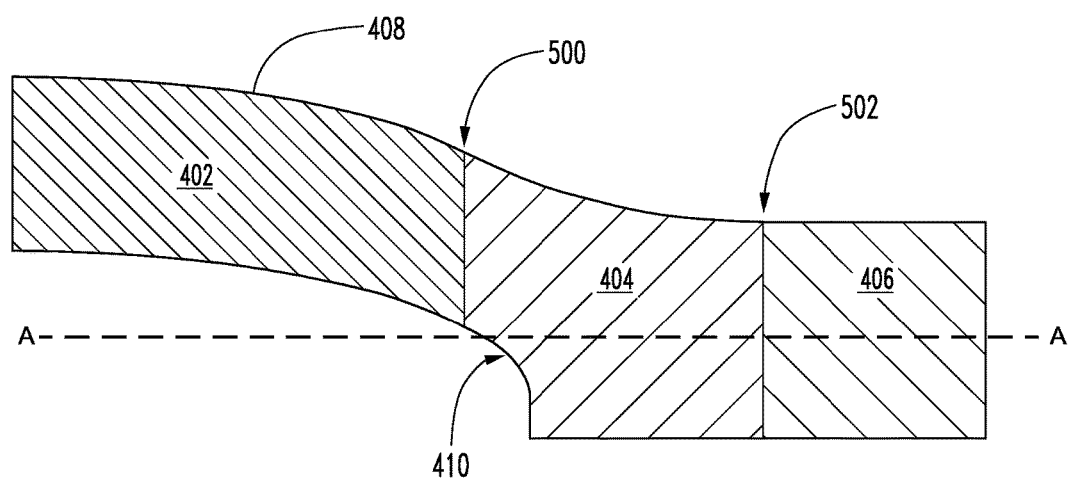
FIG. 5 is a partial axisymmetric cross-sectional view of the die of FIG. 4.

Referring to FIGS. 4 and 5, an exemplary embodiment of a curved die 400 is shown in greater detail. The die 400 can form a first curved face or surface 408 and a second curved face or surface 410. The first curved surface 408 defines a convex curvature and the second curved surface 410 defines a concave curvature. The die 400 can be disposed in an extruder such as the one shown in FIG. 3 with the first curved surface 408 forming the outlet side of the die 400 and the second curved surface 410 forming the inlet side thereof. In a different configuration, the first curved surface 408 can form the inlet side of the die 400 and the second curved surface 410 can form the outlet side thereof. As such, the curved shape of the die 400 can enable the die 400 to resist the pressures applied during the extrusion process with more efficiency, thus being capable of withstanding higher pressures in the extruder or having a reduced thickness. Similar to that shown in FIG. 3, the extrusion direction is oriented through the thickness of the die and may be in either direction (i.e., the die may be considered either concave or convex).

As shown in FIG. 4, the die 400 can form a circular cross-section having a radius defined between a center point 412 and an outer edge 414. The die 400 may take the form of different cross-sections depending on the extruder. Therefore, the circular cross-section of the die 400 in FIGS. 4 and 5 is exemplary and may form a square, rectangular, oval, or polygonal cross-section in other embodiments.

The die 400 can also include a plurality of defined regions. In the embodiment of FIGS. 4 and 5, the die 400 is divided into three distinct regions. A first region 402 is defined near the center of the die 400. In the first region 402, die features such as feedholes and slots (see FIG. 8) that form a honeycomb shape can be defined therein. The first region 402 can comprise an area defined between the center point 412 and a first transition point 500. In addition, the first region 402 can be referred to as the "curved region" as it includes at least a portion of the curvature of the die 400.

Moving radially outward from the first transition point 500 is a second region 404. The second region 404 can be referred to as a "transition region" as it defines an area of transition between the curvature of the first region 402 and a clamping/attachment portion of the die 400. The second region 404 can also add support and structural integrity to the first region 402 of the die 400. The second region 404 may comprise solid material in which there are no feedholes or slots defined therein. Alternatively, there may be one or more feedholes and slots defined in the second region 404 of the die 400. The area of the second region 404 can be defined between the first transition point 500 and a second transition point 502.

The area between the second transition point 502 and outer edge 414 defines a third region 406. The third region 406 can be used for flanging and attachment of the die 400 to the extruder. The third region 406 may be substantially flat and generally does not include any feedholes or slots.

One feature of the curved die 400 in FIGS. 4 and 5 is the curved shape of the first region 402 and a portion of the second region 404. The third region 406 can define a plane through which axis A-A passes. The curved, out-of-plane shape of the first region 402 and portion of the second region 404 can be ellipsoidal, conical, tori-spheroid, hemispherical, or generally curved. This shape may be varied depending on application. Although in FIG. 5, both the first region 402 and a portion of the second region 404 form the out-of-plane curved shape, in other embodiments only the first region 402 forms the curved shape. In this instance, the second region 404 and third region 406 would be substantially flat and defined in the same plane.

Figure 6:
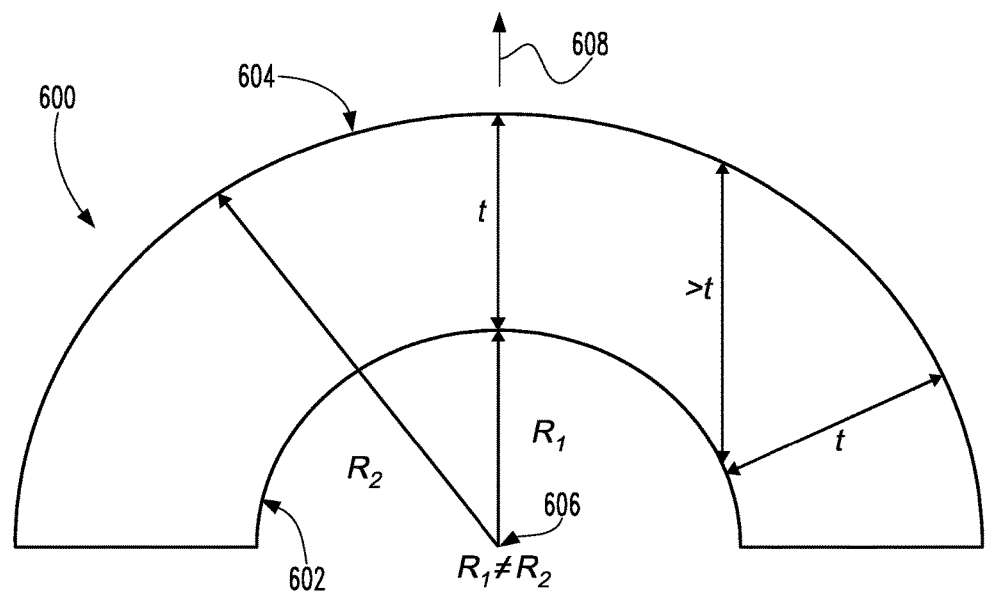
FIG. 6 is a first embodiment of a curved die design with a constant thickness orthogonal to an outer curved surface.
Figure 7:
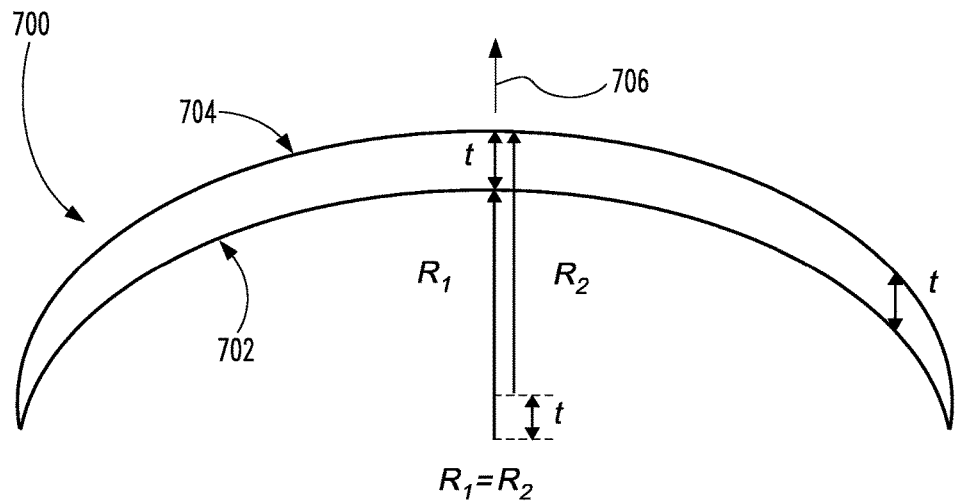
FIG. 7 is a second embodiment of a curved die design with a constant thickness in an extrusion direction.

Another aspect of a curved die is shown in FIGS. 6 and 7. In FIG. 6, a curved die 600 is shown having a first radius, $R_1$, defined from a center point 606. A first curvature 602 is radially disposed from the center point 606 at a distance equivalent to the first radius, $R_1$. The die 600 can include a second curvature 604 radially disposed from the center point 606 at a distance equivalent to a second radius, $R_2$. As shown in FIG. 6, the die thickness, t, is constant in an orthogonal direction with respect to the second curvature 604. However, in the extrusion direction (i.e., direction identified by arrow 608), the thickness, t, is only constant at one point orthogonal with the second curvature 604, this point being aligned with the center point 606.

To enable a more balanced and uniform impedance to flow across the die, the die thickness can remain substantially constant in the extrusion direction (i.e., vertical direction). An embodiment of this is shown in FIG. 7. Here, a curved die 700 can include a first curvature 702 and a second curvature 704. The die thickness, t, is constant between the first curvature 702 and second curvature 704 in the extrusion direction, which is identified by arrow 706. Although flow characteristics of batch material through the die 700 in the extrusion direction 706 are improved, the orthogonal thickness approaches zero near the edges of the die 700. Thus, the second region 404 as shown in FIG. 4 can add structural integrity to the die 700 in this location, but in doing so the vertical thickness (e.g., in the extrusion direction) becomes non-constant.

Figure 8:
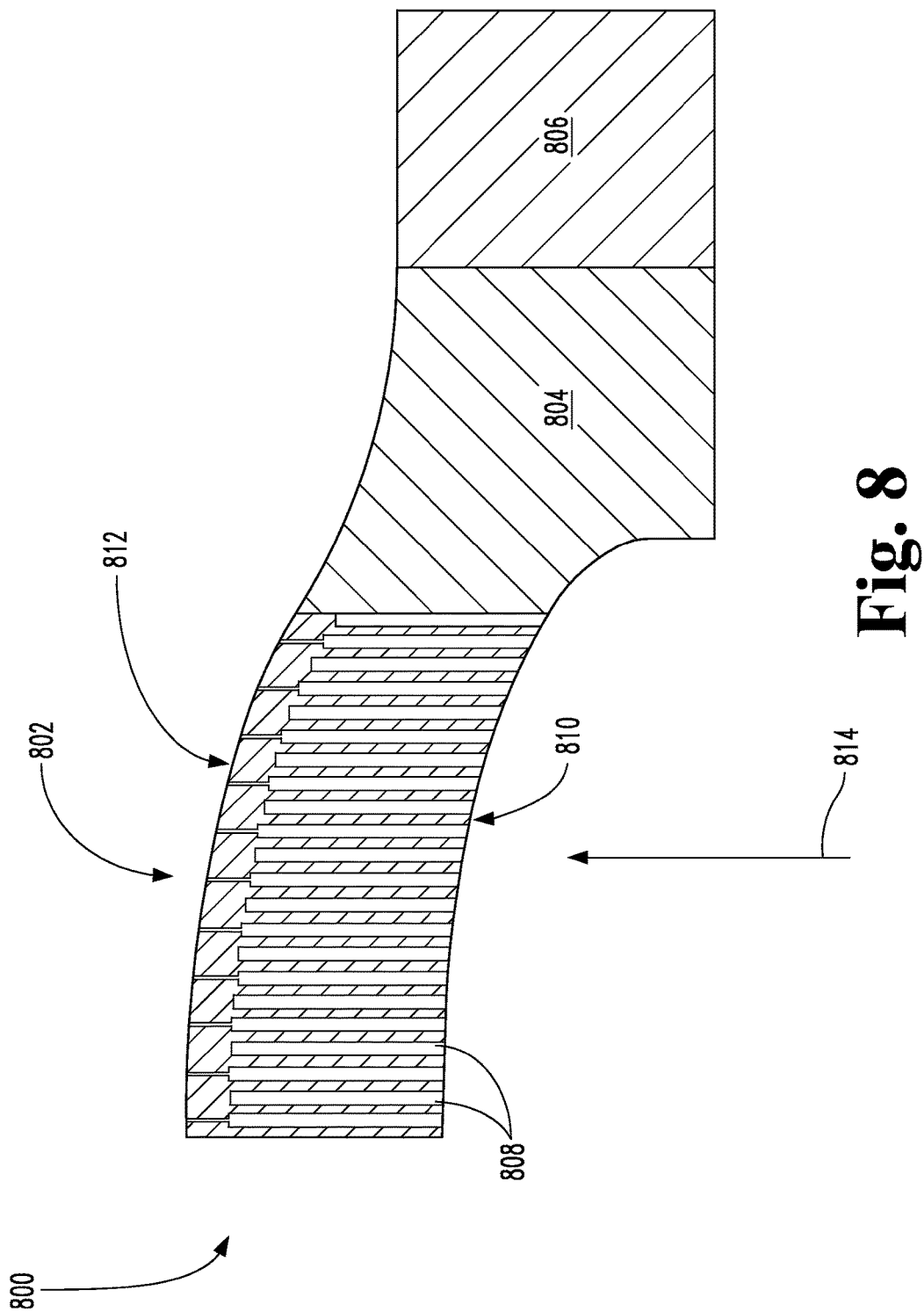
FIG. 8 is a partial cross-sectional view of feedhole and slot pattern in a curved die.

Referring to FIG. 8, an exemplary curved die 800 is shown. The die 800 can include a first region 802, a second region 804, and a third region 806 similar to that of FIGS. 4 and 5. The curved die 800 can include a first curved side 810 and a second curved side 812. The first curved side 810 can be an inlet and the second curved side 812 can be an outlet such that material flowing in the extrusion direction (identified by arrow 814) enters the die 800 through the first curved side 810 and exits from the second curved side 812. To form an extruded cross-section or pattern, the die 800 can include a plurality of feedholes and slots 808 defined therein. As shown, the plurality of feedholes and slots 808 is aligned substantially parallel to the extrusion direction 814. The depth of the plurality of feedholes 808 can be designed smaller than conventional feedhole depth, and in doing so, the time required to machine the plurality of feedholes and slots 808 can be reduced.

The curved die can be manufactured according to known production methods. For example, direct metal laser sintering (DMLS) methods can be used to produce the curved die. A Z-axis adjustment may be required for drilling and slotting methods. Slots, for instance, can be machined by plunge electrical discharge machining (EDM). Die blanks can be formed by several methods such as computer numerical control (CNC), pressing, machining, or hot forming.

First Case Study Example

Figure 9:
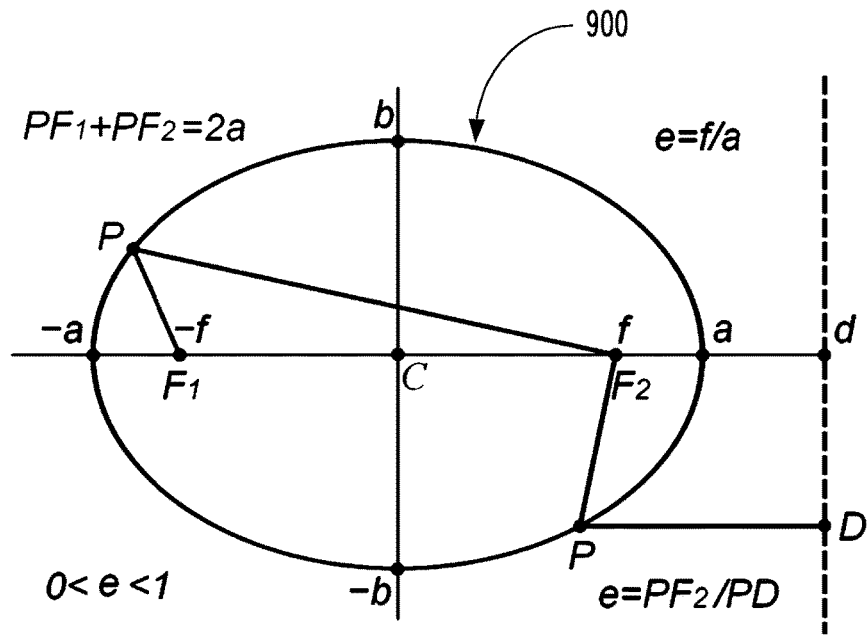
FIG. 9 is a diagram of an ellipse with basic dimensions.
Figure 10:
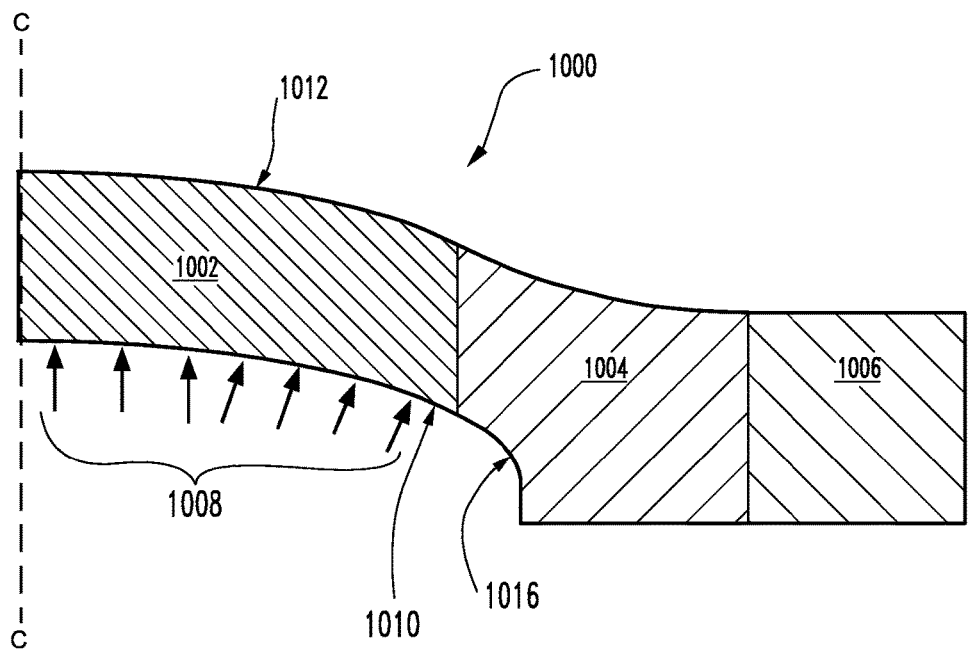
FIG. 10 is a partial cross-sectional view of a curved die with applied loads.

Referring to FIGS. 9-14, a substantially hemi-ellipsoid die 1000 was formed similar to the die shown in FIGS. 4, 5, and 8. The die 1000 includes a first region 1002 disposed near the center thereof, a second region 1004 surrounding the first region 1002, and a third region 1006 for coupling to an extruder. The first region 1002 can include a first curvature 1010 and a second curvature 1012, where the thickness of the die 1000 is defined between the first curvature 1010 and second curvature 1012. As shown in FIG. 10, the first curvature 1010 is the inlet side or portion of the die 1000 where pressure 1008 exerts a force against the die 1000. As such, batch material passes through a plurality of feedholes and slots defined in the die 1000 from the inlet side (i.e., first curvature 1010) to the outlet side (i.e., second curvature 1012).

The design of the first region 1002 of the die 1000 is similar to that shown in FIGS. 7 and 8. In other words, the feedholes and slots (not shown) are aligned substantially parallel to the extrusion direction. In this case study, the primary variables of interest were the amount of curvature in the die as designated by the minor elliptical radius "b" of an ellipse 900 and die thickness "t" as shown in FIGS. 7 and 9. The other values were maintained approximately constant in the analysis.

In this example, a conventional die was also analyzed having a diameter of 11.5 inches and a thickness of 2.4 inches. The conventional die included flat inlet and outlet faces as shown in FIG. 2. From the study, curvature added to the inlet and outlet faces of the die resulted in a decreased thickness of the die or the ability to withstand greater internal pressures.

The analysis confirmed several key observations comparing a curved die to a flat-faced die. First, the maximum deflection of the die occurs near the center of the die. Second, there are two design areas that may become stress-limiting features. The first design area is the centerline which is disposed along axis C-C of FIG. 10. It can be desirable therefore to minimize peak Von-Mises stress in this location. A substantial portion of the first region 1002 is exposed to higher stress compared to the second region 1004 and third region 1006, but the greatest deflection and most stress occurs at or near this centerline. It can also be desirable to maintain reasonable stress levels in the knuckle or fillet portion 1016 of the second region 1004.

Figure 11:
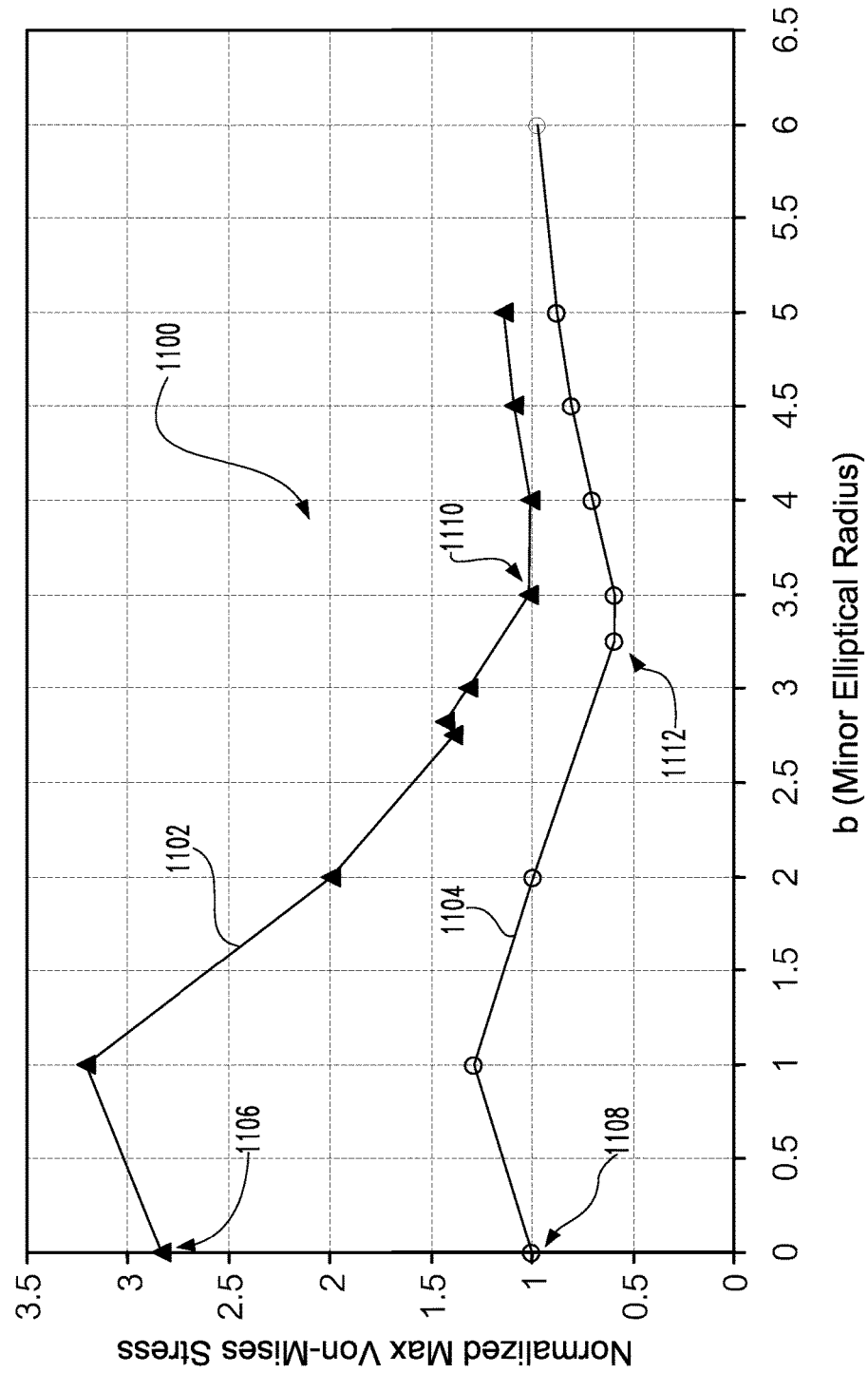
FIG. 11 is a diagram of the impact of curvature and thickness on die stress.

In this case study, the amount of curvature (i.e., minor elliptical radius "b" of the ellipse 900) was varied to better understand the effects of a curved die compared to a conventional, flat die. Referring to FIG. 11, a chart 1100 illustrates the effects curvature has on peak Von-Mises stress at the centerline of the die. A first curve 1102 is provided for a first die having a thickness of approximately 1.4 inches and a second curve 1104 is provided for a second die having a thickness of approximately 2.4 inches. In FIG. 11, a first data point 1106 represents the first die configured as a conventional, flat-faced die. In other words, the minor elliptical radius "b" is zero. Similarly, a second data 1108 represents the second die configured as a conventional, flat-faced die. As expected due to the differences in thickness, the first conventional die has a higher peak stress at the first data point 1106 of about 2.8 compared to the second conventional die at the second data point 1108 of about 1.

As the radius "b" was varied, however, the results confirmed a reduction in peak stress or die thickness by approximately 42%. For example, a third data point 1110 is shown with respect to the first die curve 1102. Here, a constant stress exerted at the centerline of the die allowed for a 42% reduction in thickness of the die (i.e., approximately 1.4 inches thick, which corresponds to the second data point 1108 of the second, thinner die) having a radius of about 3.5 inches. A fourth data point 1112 along the second die curve 1104 represents a curved die having a thickness of about 2.4 inches. Here, the thickness was held constant and the stress at the centerline decreased by approximately 42% (e.g., from 1.0 to 0.58 in FIG. 11). Therefore, by designing the die with a curved face, either the thickness can be reduced or the stress exerted on the die can be reduced.

Figure 12:
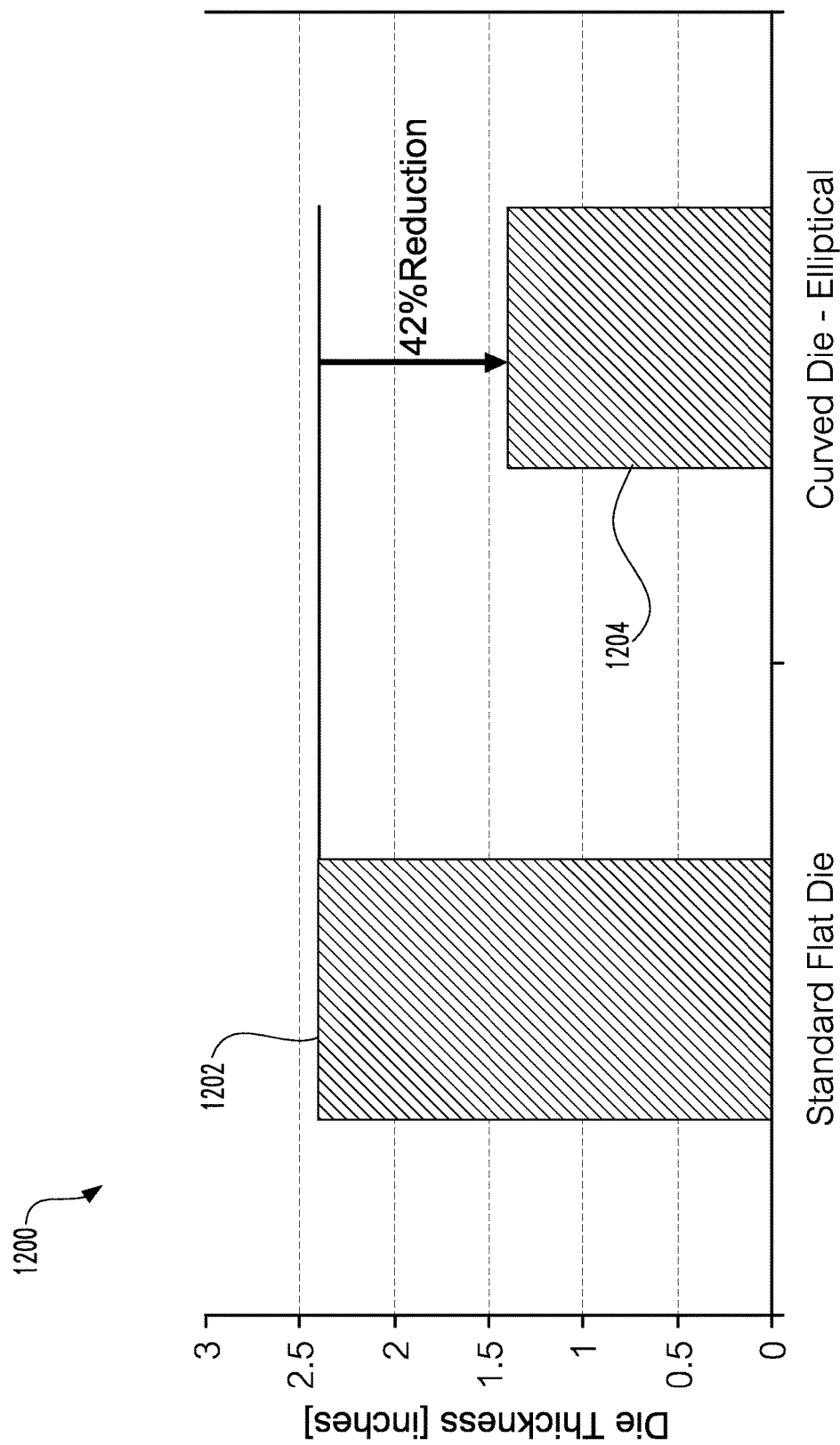
FIG. 12 is a chart illustrating thickness reduction capability of a curved die.
Figure 13:
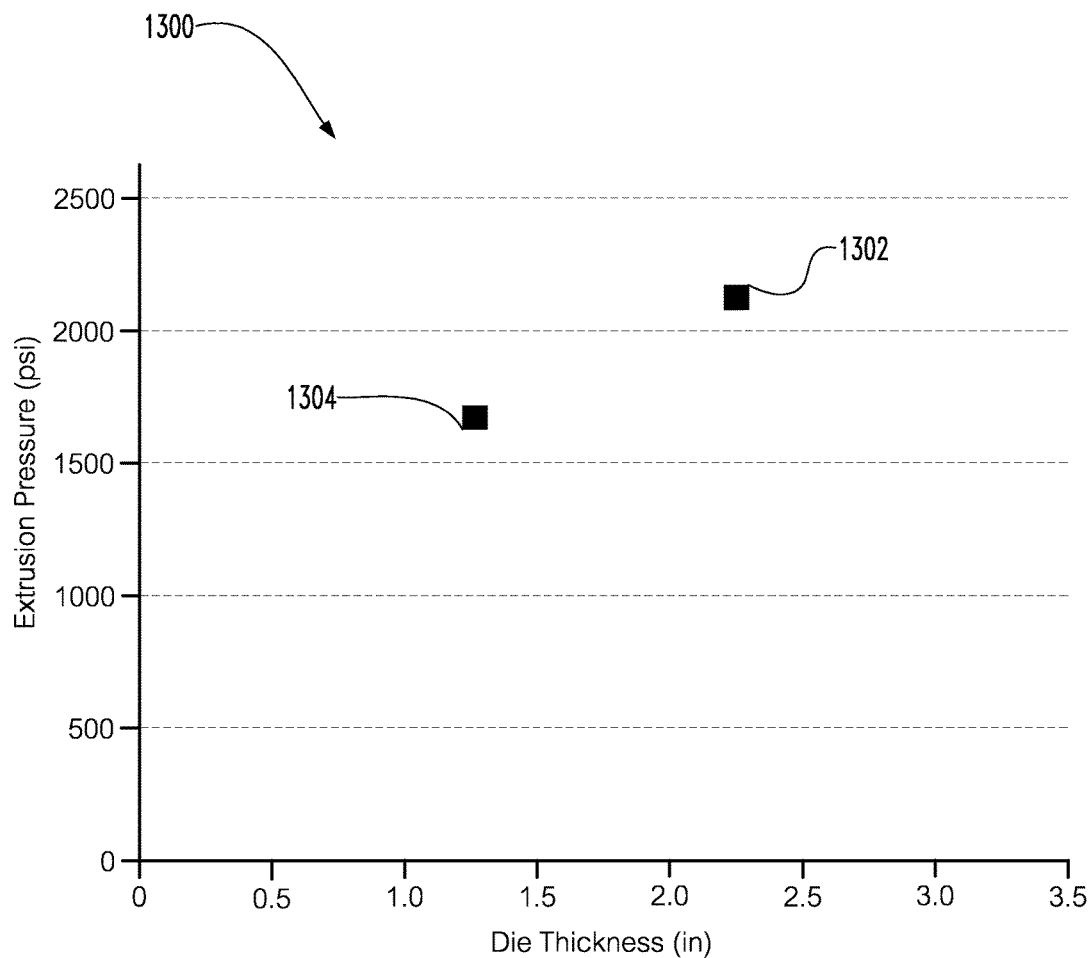
FIG. 13 is a diagram illustrating die pressure reduction corresponding to thickness reduction of the die.
Figure 14:
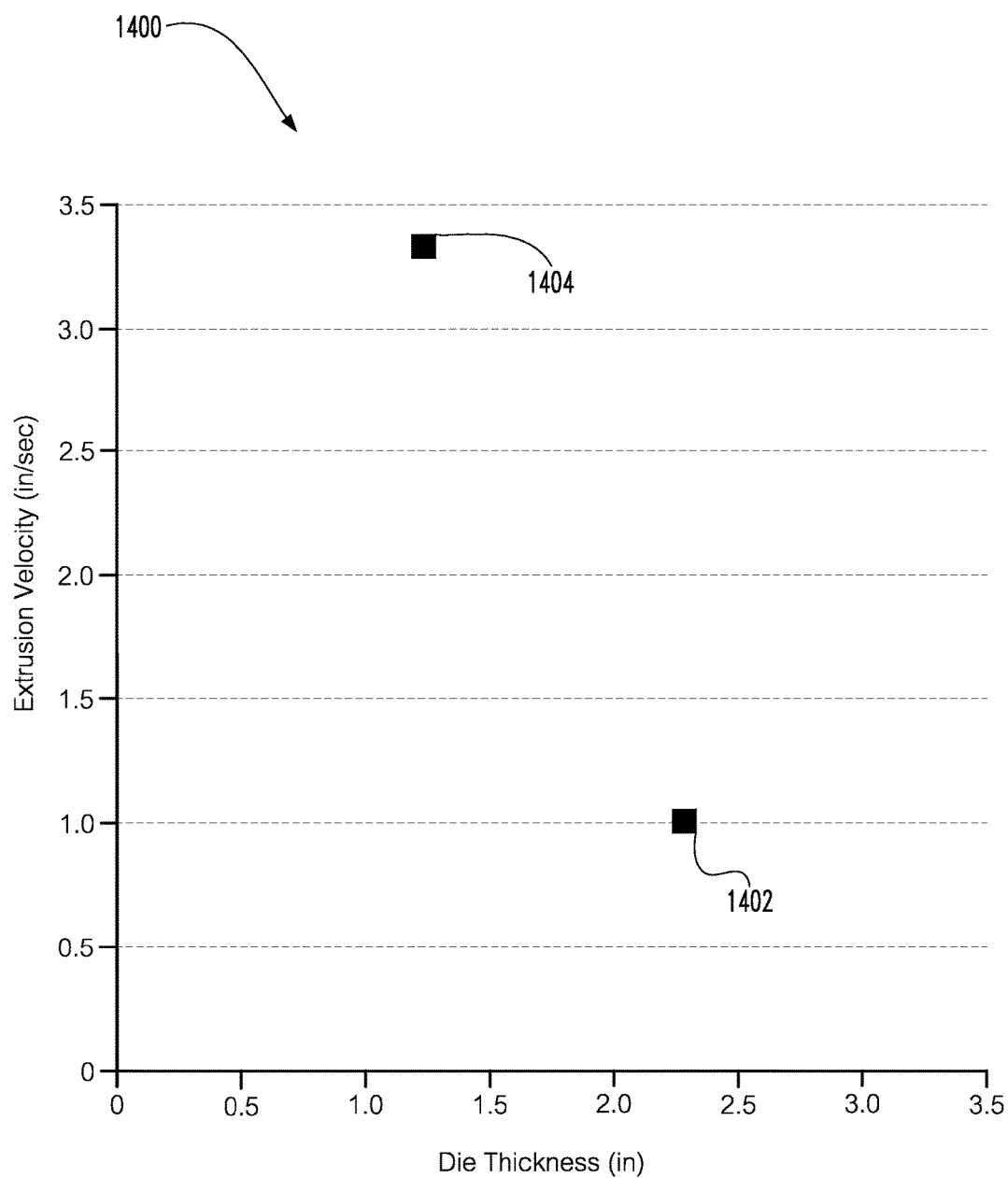
FIG. 14 is a diagram illustrating the impact of die thickness reduction on extrusion velocity.

FIG. 12 confirms the die thickness reduction results. In FIG. 12, a chart 1200 illustrates a conventional, flat die 1202 and a curved die 1204. Both the first die 1202 and second die 1204 were approximately 11.5 inches in diameter. As shown, the first die 1202 had a thickness of about 2.4 inches and maintained its structural integrity when exposed to a constant stress. The second die 1204 maintained its structural integrity when exposed to the same constant stress as the first die 1202, but the second die 1204 had a thickness approximately 42% less than the first die 1202 (e.g., approximately 1.4 inches thick).

Second Case Study Example

A second case study example further analyzed the effects of die curvature on pressure and extrusion velocity. In this study, a heavy-duty, stainless steel die type NG having a thickness of about 2.37 inches was used. This first, conventional die (i.e., having flat inlet and outlet faces) was compared to a second, curved die of which the overall thickness and feedhole and slot depths were reduced by about 40%. Cordierite composition rheological parameters were used for this analysis and an extrusion velocity of about 1.0 inches/second was chosen for the baseline case.

The calculated die pressure for the conventional die was approximately 2099 psi. For the curved die, the calculated die pressure decreased by nearly 23% to about 1618 psi. This is illustrated in a chart 1300 of FIG. 13. A first data point 1302 represents the conventional die having a thickness of about 2.37 inches and having a die pressure of about 2099 psi. A second data point 1304 represents the curved die having a 40% reduced thickness and feedhole and slot depths. The curved die, at the same extrusion velocity of 1 inch/second, had a calculated die pressure of 1618 psi which is nearly 23% less than the conventional die.

In this second example, the effects on extrusion velocity were also analyzed. To do so, the extrusion velocity input parameter for the curved die was increased until the die pressure was equal to that of the conventional die at 1 inch/second (i.e., 2099 psi). In doing so, the extrusion velocity increased to approximately 3.3 inches/second at a die pressure of 2099 psi for the curved die, thereby resulting in an increase in throughput of greater than three times. This too is shown in a chart 1400 of FIG. 14. In the chart 1400, a first data point 1402 represents the extrusion velocity of 1.0 inches/second of the conventional die. A second data point 1404 represents an increased extrusion velocity of 3.3 inches/second of the curved die at the same die pressure (i.e., 2099 psi). Here, by adding curvature to the die and thereby reducing its thickness and feedhole and slot depth, the extrusion velocity through the die was improved by over three times.

Homogenizer and Other Extrusion Plates

Figure 15:
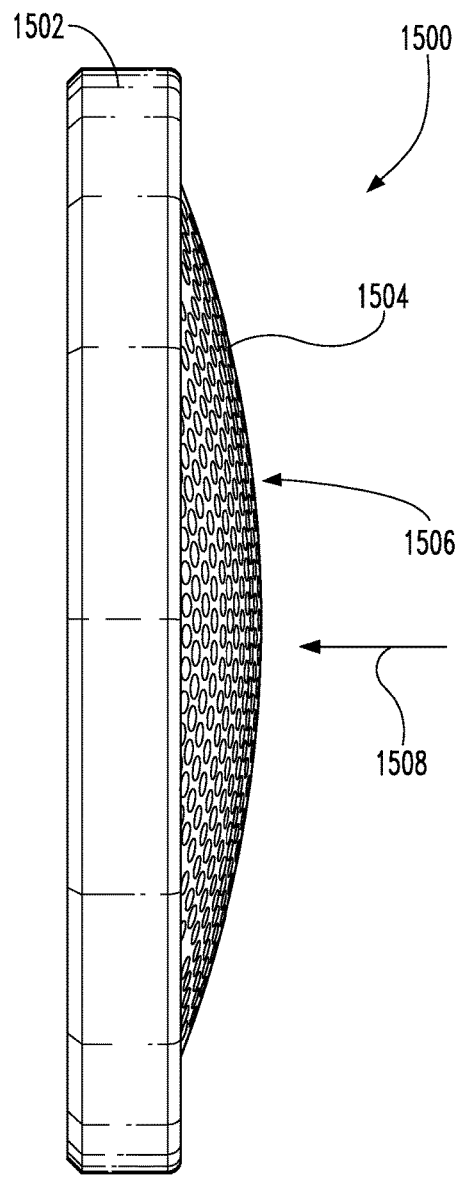
FIG. 15 is a side view of a homogenizer having a curved face.
Figure 16:
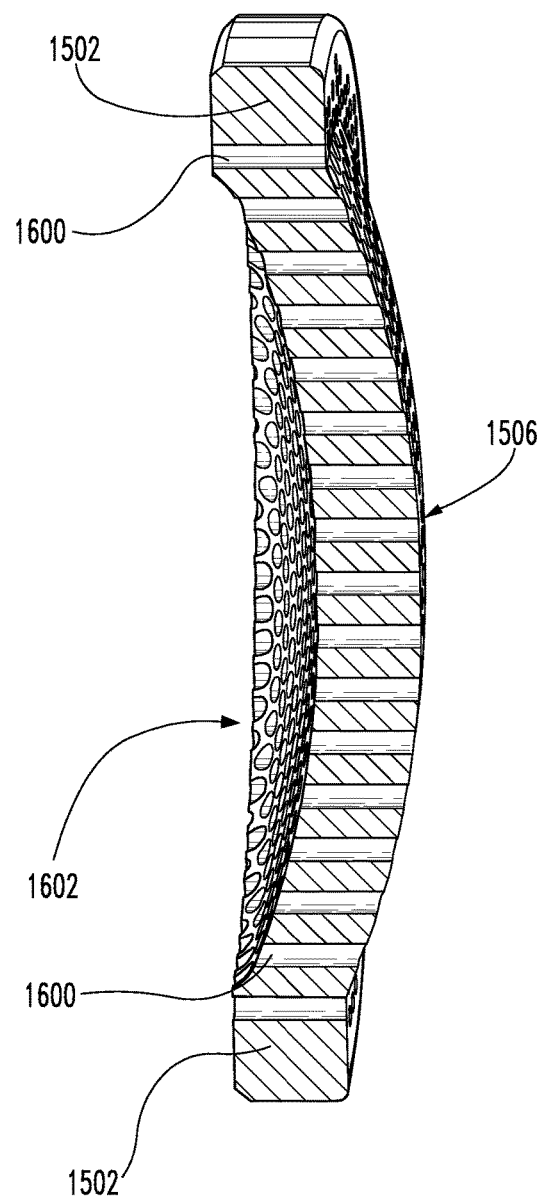
FIG. 16 is a cross-sectional side view of the homogenizer of FIG. 15 illustrating both concave and convex faces with defined channels.

As described with respect to FIG. 1, an extruder can include additional flow devices such as the static plate 118 and homogenizer plate 120. A conventional homogenizer plate includes a flat inlet face and a flat outlet face, similar to the conventional die described above. In FIGS. 15 and 16, however, a different homogenizer plate 1500 can include a defined curvature at an inlet face 1506 and a defined curvature at an outlet face 1602. The homogenizer plate 1500 can include an outer flange member 1502 for coupling to the extruder. The flange member 1502 surrounds screen-like material 1504 that forms the homogenizer plate 1500. The flange member 1502 can be disposed in a plane such that the inlet face 1506 curves outwardly from the plane. This is best shown in FIG. 15. In a different homogenizer plate, however, one of the inlet face and outlet face can be straight-faced.

The screen-like material 1504 can define a plurality of channels or feedholes 1600. Batch material can pass from the inlet side 1506 to the outlet side 1602 through the plurality of channels 1600. In this instance, batch material can flow through the homogenizer 1500 along an extrusion direction identified by arrow 1508. As shown, the plurality of channels 1600 is aligned substantially parallel to the extrusion direction 1508. In a different embodiment, the extrusion direction can be opposite of that shown in FIG. 15 such that the inlet corresponds to face 1602 and the outlet corresponds to face 1506.

Similar to the design of the homogenizer plate 1500, a static plate or any other flow device disposed in the extruder can include at least one curved face. The curved face can be oriented towards the inlet or outlet side of the extruder. The curved face can reduce the pressure drop across the flow device and improve flow characteristics of the batch material through the extruder.

While exemplary embodiments incorporating the principles of the claimed invention have been disclosed hereinabove, the present disclosure is not limited to the disclosed embodiments. Instead, this disclosure is intended to cover any variations, uses, or adaptations of the claimed invention using its general principles. Further, this application is intended to cover such departures from the present disclosure as come within known or customary practice in the art to which the claimed invention pertains and which fall within the limits of the appended claims.

What is claimed is:

1. An extrusion apparatus for forming an extrudate, comprising:
    a barrel having an inlet at one end thereof and an outlet at an opposite end, the barrel defining a chamber between the inlet and the outlet;
    a pressure mechanism configured to pressurize the chamber and configured to move material from the inlet to the outlet;
    a flow path defined in the chamber between the inlet and the outlet, the flow path defining a flow direction;
    a die coupled to the outlet of the barrel, the die comprising:
        a body defined along a plane, the plane being substantially perpendicular to the flow direction, the body comprising a first region, a second region, and a third region, wherein the second region is defined between the first region and the third region;
        an inlet side and an outlet side, where the thickness of the body is defined between the inlet side and the outlet side;

a plurality of feedholes and a plurality of slots defined in the first region between the inlet side and the outlet side, the plurality of feedholes adapted to receive the material at the inlet side and the plurality of slots adapted to extrude the material at the outlet side;

wherein, the first region comprises a center of the body and the outlet side of the first region and at least a portion of the outlet side of the second region form a curvature that extends outwardly from the plane, the first region having a substantially constant thickness in the flow direction, and the second region having a substantially non-constant thickness in the flow direction;

wherein the curvature is ellipsoidal, tori-spheroidal, or hemispherical; and a homogenizer disposed in the chamber between the inlet and the die.

2. The extrusion apparatus of claim 1, wherein the plurality of feedholes is substantially parallel to one another.

3. The extrusion apparatus of claim 1, wherein the plurality of feedholes is defined in the body substantially along the flow direction.

4. The extrusion apparatus of claim 1, wherein the third region comprises an edge of the body, wherein the third region is coupled to the extrusion apparatus.

5. The extrusion apparatus of claim 4, wherein the first region comprises:
a first radial thickness defined substantially in the flow direction near the center of the first region; and
a second radial thickness defined at an interface portion of the first and the second regions, wherein the second radial thickness is less than the first radial thickness.

6. The extrusion apparatus of claim 1, wherein the homogenizer comprises:
an inner portion and an outer portion, the outer portion being coupled to the barrel and the inner portion comprising a first side oriented towards the inlet and a second side disposed opposite the first side; and
a plurality of openings defined in the inner portion between the first side and the second side, the plurality of openings being defined substantially parallel to the flow direction;
wherein, at least one of the first side and the second side has a curved cross-section.

7. The extrusion apparatus of claim 6, wherein both the first side and the second side have curved cross-sections.

8. The extrusion apparatus of claim 1, further comprising a plate disposed in the chamber between the inlet and the die, the plate having an outer portion coupled to the barrel and an inner portion comprising a filter, the inner portion having at least one curved face.

9. The extrusion apparatus of claim 8, wherein the inner portion has a first curved face and a second curved face, the first curved face is oriented towards the inlet and the second curved face is oriented towards the die.

10. An extrusion apparatus for forming an extrudate, comprising:
a barrel having an inlet at one end thereof and an outlet at an opposite end, the barrel defining a chamber between the inlet and the outlet;
a pressure mechanism configured to pressurize the chamber and configured to move material from the inlet to the outlet;
a flow path defined in the chamber between the inlet and the outlet, the flow path defining a flow direction;
a die coupled to the outlet of the barrel, the die comprising:
a one-piece body defined along a plane, the plane being substantially perpendicular to the flow direction, the one-piece body comprising a first region, a second region, and a third region, the second region being defined between the first region and the third region;
an inlet side and an outlet side, where the thickness of the one-piece body is defined between the inlet side and the outlet side;
a plurality of feedholes and a plurality of slots defined in the first region between the inlet side and the outlet side of the one-piece body, the plurality of feedholes adapted to receive the material at the inlet side and the plurality of slots adapted to extrude the material at the outlet side;
wherein, the first region comprises a center of the one-piece body and the outlet side of the first region of the one-piece body forms a curvature that extends outwardly from the plane, the first region having a substantially constant thickness in the flow direction and the second region having a substantially non-constant thickness in the flow direction; and
a homogenizer disposed in the chamber between the inlet and the die, the homogenizer comprising:
an inner portion and an outer portion, the outer portion being coupled to the barrel and the inner portion comprising a first side oriented towards the inlet and a second side disposed opposite the first side; and
a plurality of openings defined in the inner portion between the first side and the second side, the plurality of openings being defined substantially parallel to the flow direction;
wherein, at least one of the first side and the second side of the homogenizer has a curved cross-section.

11. The extrusion apparatus of claim 10, wherein the plurality of feedholes is substantially parallel to one another.

12. The extrusion apparatus of claim 10, wherein the plurality of feedholes is defined in the body substantially along the flow direction.

13. The extrusion apparatus of claim 10, wherein the curvature is ellipsoidal, tori-spheroidal, or hemispherical.

14. The extrusion apparatus of claim 10, wherein the third region comprises an edge of the body, wherein the third region is coupled to the extrusion apparatus.

15. The extrusion apparatus of claim 10, wherein the first region comprises:
a first radial thickness defined substantially in the flow direction at a center portion of the first region; and
a second radial thickness defined at an interface portion of the first and the second regions, wherein the second radial thickness is less than the first radial thickness.

16. The extrusion apparatus of claim 10, wherein both the first side and the second side have curved cross-sections.

17. The extrusion apparatus of claim 10, further comprising a plate disposed in the chamber between the inlet and the die, the plate having an outer portion coupled to the barrel and an inner portion comprising a filter, the inner portion having at least one curved face.

18. The extrusion apparatus of claim 17, wherein the inner portion has a first curved face and a second curved face, the first curved face is oriented towards the inlet and the second curved face is oriented towards the die.

19. The extrusion apparatus of claim 1, wherein the curvature of the first region is ellipsoidal or tori-spheroidal.

20. The extrusion apparatus of claim 10, wherein the die is circular in transverse cross-section.

21. The extrusion apparatus of claim 10, wherein the outlet side of the one-piece body is convex in one of the first region or the second region and concave in the other of the first region or the second region.

22. The extrusion apparatus of claim 10, wherein the second region forms a second region curvature on a same side as the curvature of the first region, wherein the second region curvature is different than the curvature of the first region.

23. The extrusion apparatus of claim 1, wherein the plurality of slots form a honeycomb shape.

24. The extrusion apparatus of claim 10, wherein the plurality of slots form a honeycomb shape.

* * * * *